(12) United States Patent
Shayer et al.

(10) Patent No.: US 7,996,666 B2
(45) Date of Patent: Aug. 9, 2011

(54) USER INFLUENCED LOADING SEQUENCE OF STARTUP APPLICATIONS

(75) Inventors: David A. Shayer, Palo Alto, CA (US); Szu-Wen Huang, Fremont, CA (US); Jesse W. Boettcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 937 days.

(21) Appl. No.: 11/899,025

(22) Filed: Sep. 4, 2007

(65) Prior Publication Data

US 2009/0063837 A1 Mar. 5, 2009

(51) Int. Cl.
*G06F 15/177* (2006.01)

(52) U.S. Cl. ............ 713/2; 715/864

(58) Field of Classification Search ....... 713/2; 715/864
See application file for complete search history.

(56) References Cited

U.S. PATENT DOCUMENTS

| | | | |
|---|---|---|---|
| 5,379,057 A | 1/1995 | Clough et al. | |
| 5,438,622 A | 8/1995 | Normile et al. | |
| 5,530,718 A | 6/1996 | Gradeler et al. | |
| 5,675,362 A | 10/1997 | Clough et al. | |
| 5,764,987 A | 6/1998 | Eidt et al. | |
| 5,812,199 A | 9/1998 | Lu et al. | |
| 5,812,878 A | 9/1998 | Christiansen et al. | |
| 5,860,006 A | 1/1999 | Osborne et al. | |
| 6,219,830 B1 | 4/2001 | Eidt et al. | |
| 6,311,283 B1 | 10/2001 | Gonzalez | |
| 6,314,566 B1 | 11/2001 | Arrouye et al. | |
| 6,346,012 B1 | 2/2002 | Cheng et al. | |
| 6,629,249 B2 | 9/2003 | Gonzalez | |
| 6,785,808 B2 * | 8/2004 | Huntington et al. | 713/2 |
| 6,837,717 B2 | 1/2005 | Wu et al. | |
| 6,887,310 B2 | 5/2005 | Hwu et al. | |
| 6,934,834 B2 * | 8/2005 | Melin et al. | 713/2 |
| 7,079,366 B1 | 7/2006 | Johas Teener et al. | |
| 7,171,674 B2 | 1/2007 | Arrouye et al. | |
| 7,275,150 B2 * | 9/2007 | Pagan | 713/1 |
| 7,295,612 B2 | 11/2007 | Haskell et al. | |
| 7,335,048 B1 | 2/2008 | Chen et al. | |
| 7,433,546 B2 | 10/2008 | Marriott et al. | |
| 2006/0100978 A1 | 5/2006 | Heller et al. | |
| 2006/0265637 A1 | 11/2006 | Marriott et al. | |
| 2006/0277402 A1 * | 12/2006 | Wakabayashi | 713/1 |
| 2007/0028085 A1 * | 2/2007 | Inohiza | 713/1 |
| 2007/0112891 A1 | 5/2007 | Marriott et al. | |
| 2007/0162736 A1 * | 7/2007 | Wu et al. | 713/2 |
| 2007/0217716 A1 | 9/2007 | Marriott et al. | |
| 2007/0271065 A1 | 11/2007 | Gupta et al. | |
| 2007/0271116 A1 | 11/2007 | Wysocki et al. | |
| 2008/0065988 A1 | 3/2008 | Gupta et al. | |
| 2008/0158180 A1 | 7/2008 | Krah et al. | |
| 2008/0162538 A1 | 7/2008 | Kary | |

(Continued)

*Primary Examiner* — Albert Wang
(74) *Attorney, Agent, or Firm* — Fletcher Yoder PC

(57) ABSTRACT

There is provided a method for altering a sequence in which programs and content are loaded upon startup of an electronic device. A user may change the loading sequence by selecting a program or content before the loading sequence has finished. In addition, the altered loading sequence may be saved and utilized when the electronic device is powered on again. There is also provided a tangible, machine-readable medium for performing the described method. Finally, there is provided an electronic device having a memory device for storing a loading program that defines a loading sequence, a processor for loading programs and content based on the loading sequence, and a user interface for delivering user input to the loading program to alter the loading sequence.

22 Claims, 3 Drawing Sheets

U.S. PATENT DOCUMENTS

2008/0307394 A1  12/2008  Marchant
2009/0033689 A1   2/2009  Avkarogullari et al.
2009/0058863 A1   3/2009  Avkarogullari et al.
2009/0058872 A1   3/2009  Boettcher et al.
2009/0063837 A1   3/2009  Shayer et al.
2009/0063964 A1   3/2009  Huang et al.
2009/0064013 A1   3/2009  Lee et al.
2009/0064021 A1   3/2009  Boettcher et al.
2009/0064039 A1   3/2009  Lee et al.

* cited by examiner

USER INFLUENCED LOADING SEQUENCE OF STARTUP APPLICATIONS

BACKGROUND OF THE INVENTION

1. Field of the Invention

The present invention relates generally to electronic devices and, more particularly, to pre-loading information upon startup of an electronic device such as a portable music player.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

When an electronic device having a microprocessor is powered on, a boot sequence begins. Generally, the boot sequence is based on a firmware program contained on a microcontroller or read-only memory (ROM). The boot sequence may initialize programs by loading them from a non-volatile storage device, such as a hard drive, to a system memory, such as a random access memory (RAM). Once loaded into the system memory, the programs may be run by the processor. In general, an operating system is one of the first programs loaded and executed, as other programs may run in the context of the operating system.

In addition to the operating system, system applications may be loaded and executed upon startup of the device. For example, applications such as device drivers may enable functionality of system components and, therefore, may be loaded and executed for the system to operate properly. Finally, some additional applications may be loaded and executed upon startup of the device. For example, in the case of a portable music player, it may be desirable for a music player application to load and run upon startup of the device, as playing music may be the primary function of the device.

Content may also be loaded from the non-volatile storage device to the system memory upon startup of the electronic device. For example, system content such as font glyphs and views may be loaded upon startup. Font glyphs include characters and symbols in various sizes, typefaces, and styles. Views include templates describing the sizes, typefaces, and styles to be used in system displays. User content may also be loaded upon startup to enable faster access upon user selection. That is, by pre-loading content at startup, it does not need to be loaded from the storage to the memory when a user selects the content. Such content may include a music database, an artwork database, a photo database, saved workouts, imported photo rolls, contacts, calendars, notes, voice memos, etc.

In the context of the present disclosure, applications and content may be referred to generally as information. That is, system information may include both system applications and content, and may encompass the previously-described examples. Similarly, startup applications and content may be referred to as startup information and may include the previously-described applications and content which may be loaded at startup after the system information.

Generally, applications and content are loaded according to a predetermined list order. System information may be loaded in a specific order to ensure functionality of the system, while the order in which other startup information loads may be irrelevant to the functionality of the system, although one or more system applications may dictate the order in which other information is loaded upon startup. Even though the order in which the startup information is loaded is not relevant to the system functionality, the predetermined list order is not user-alterable. A user must therefore wait until the desired application or content has loaded before accessing it. Accordingly, if a user wishes to use an application or content that is near the end of the predetermined list order, each time the user turns on the device, the user must wait for the other startup information to load before accessing the desired application or content.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

In accordance with an exemplary embodiment, there is provided a process for loading startup applications or content of an electronic device. After an operating system and system applications and content are loaded from a storage device to a system memory, the startup applications and content may initially load in a predetermined order. If a user selects one of the startup applications or content, the initial loading may stop, and the selected application or content may be loaded. After the selected application or content has loaded, the other startup applications and content may resume loading in the predetermined order.

Another exemplary embodiment provides a process for organizing the order in which startup applications are loaded. Again, the operating system and system applications and content are first loaded. The startup applications and content may then load in the predetermined list order. If a user selects one of the startup applications or content, the list order may be altered such that the startup applications load in the altered order the next time the electronic device is started. Alteration of the list order may occur every time a different application or content is selected upon startup, or alteration may be based on the frequency with which a user selects each startup application, for example.

Furthermore, a process is provided which combines the loading process and the organizing process. For example, the operating system and system applications and content may be loaded. When the startup applications and content begin to load in the predetermined list order, a user selection of one of the applications or content may alter the order in which the applications and content are loaded. That is, the initial loading may stop, and the selected application or content may be loaded. The list order may also be updated based on the user selection. Other startup applications and content may load after the selected application or content has loaded. The updated list order may then be utilized to load the startup applications upon subsequent startups of the electronic device.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
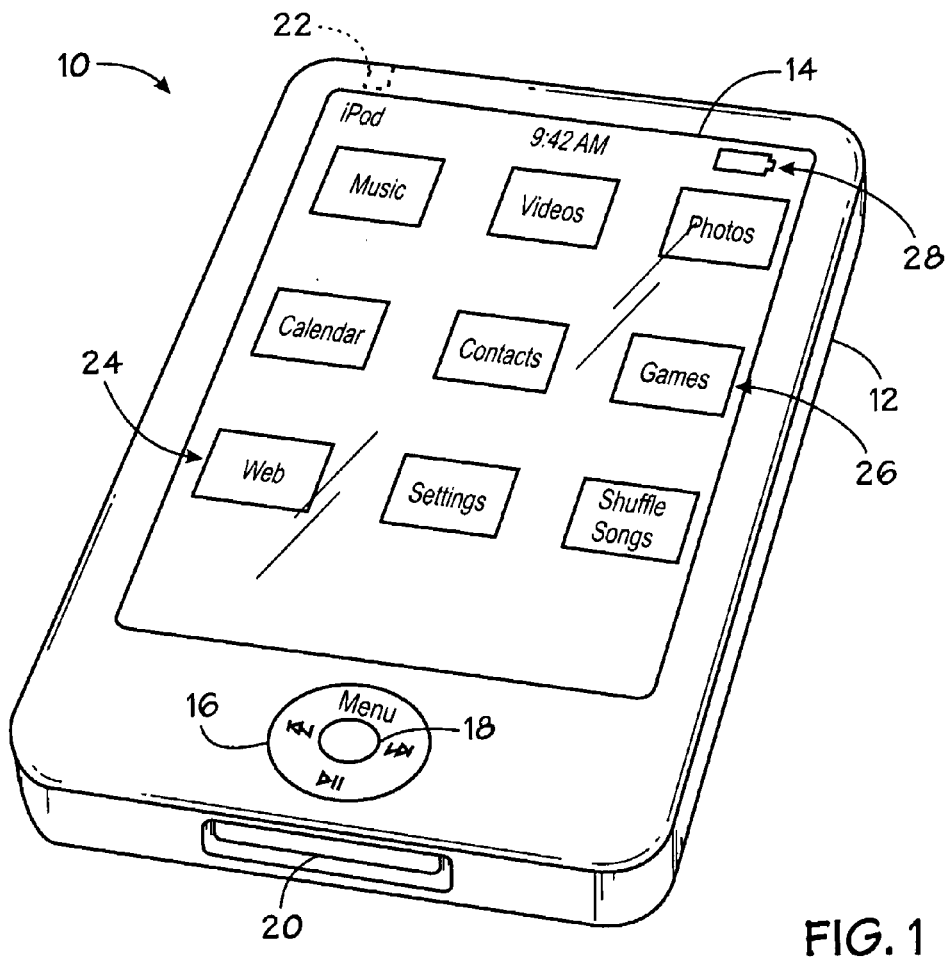
FIG. 1 is a perspective view of an example of a portable electronic device in accordance with one example of an embodiment of the present invention.

FIG. 1 illustrates an electronic device 10. In the illustrated embodiment, the electronic device 10 may be a portable music player such as any model of an iPod having a display screen or an iPhone available from Apple Inc. However, the presently disclosed techniques may be applicable to a variety of other electronic devices, such as, for example, a desktop computer, a portable computer, a cellular telephone, or any other processor-based device that loads applications upon startup. In the illustrated example, the electronic device 10 includes a casing 12, a display 14, and a user input interface 16. The user input interface 16 may be integral with the screen 14, such as a touch screen, or may be a separate device, such as a touch-sensitive circular interface. In addition, a power button 18 may be a separate from or integral with the user input interface 16. The electronic device 10 may further include an input/output port 20, such as a serial bus interface, and an audio output port 22, such as a headphone jack.

The display 14 may show a number of different screens containing a variety of information. In one example, the display 14 may show a screen 24 including a menu 26 of user-selectable applications or content and a system bar 28. The user-selectable information may include, for example, music, photos, contacts, calendars, games, settings, etc. The system bar 28 may include information such as an estimated remaining battery life. A user may make a selection via the user input interface 16 to perform a function, such as, for example, listening to music, viewing photos, playing games, looking up contacts, scheduling events, changing system settings, etc. Each selection may access stored content such as, for example, a music database, an artwork database, a photo database, saved workouts, imported photo rolls, contacts, calendars, notes, voice memos, and font glyphs.

Figure 2:
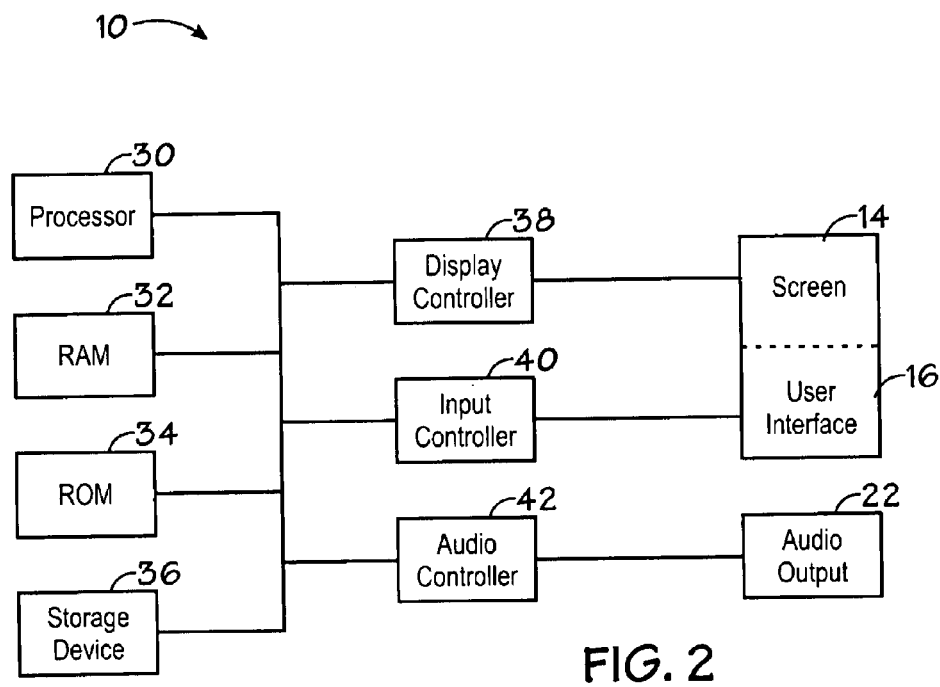
FIG. 2 is a diagrammatical view of components of the portable electronic device of FIG. 1 in accordance with one example of an embodiment of the present invention.

Turning to FIG. 2, a block diagram of components of the electronic device 10 is illustrated. The electronic device 10 may include, for example, a processor 30, a random access memory (RAM) 32, a read-only memory 34 (such as ROM, EPROM, EEPROM), and a non-volatile storage device 36. The non-volatile storage device 36 may include, for example, a read-only memory (such as ROM, EPROM, EEPROM), a hard drive, a flash memory, a tape drive, a disc drive, etc. The non-volatile storage device 36 may be used to store the user-selectable applications and content, as well as system information and an operating system. System applications may include, for example, device drivers to enable functionality for a display controller 38, an input controller 40, an audio controller 42, etc. The controllers 38, 40, and 42 may control the components of the device 10. For example, the display controller 38 may be coupled to and control the display 14. Likewise, the input controller 40 may control the user input interface 16, and the audio controller 42 may control the audio output port 22. Another system application may include a program to pre-load information from the ROM 34 or the non-volatile storage device 36 to the RAM 32 upon startup to enable quick access upon user selection.

The operating system and system applications may be loaded into the RAM 32 and executed by the processor 30 upon powering on the electronic device 10. The processor 30 may also load other applications and content onto the RAM 32 at startup, for example, in accordance with a predetermined list order as dictated by one or more system applications. After the startup information has been loaded, it may be accessed by a user more quickly than if it had not been pre-loaded. That is, by loading the applications and content upon startup, the user does not have to wait for the information to be loaded from ROM 34 or the non-volatile storage device 36 to the RAM 32 upon selection.

Figure 3:
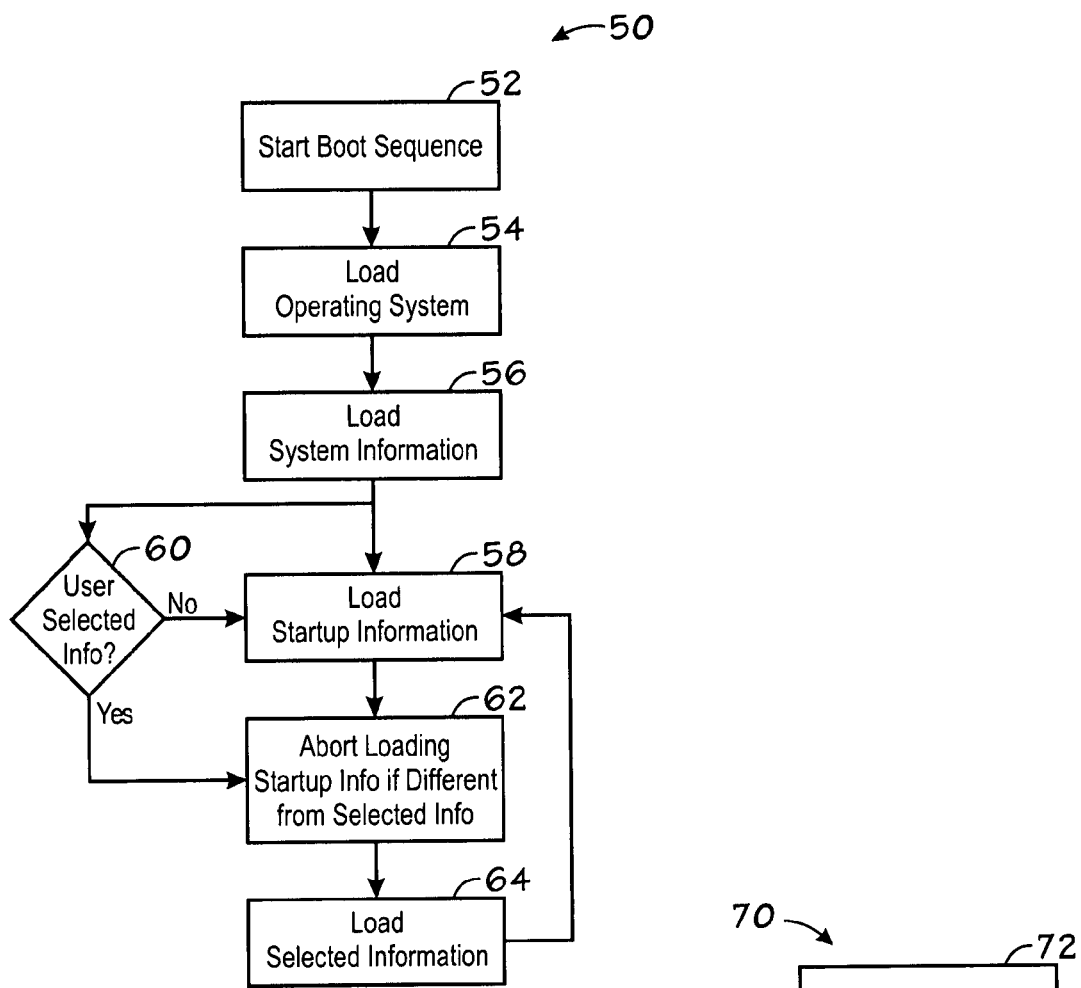
FIG. 3 is a flow chart of a method for loading startup applications in accordance with one example of an embodiment of the present invention.

A process 50 for loading the operating system, applications, and content in accordance with an embodiment of an electronic device is illustrated in FIG. 3. In the process 50, a boot sequence is started (Block 52), for example, by powering on the electronic device 10 (FIG. 1). The boot sequence may command the operating system to be loaded (Block 54), followed by the system information (Block 56). Loading the system information may include, for example, loading and executing a menu application such that the user-selectable applications and content are displayed on the display 14 (FIG. 1). After the operating system and system information have loaded, one or more of the system applications may initialize loading of additional startup information (Block 58). The additional applications and content may be loaded in a predetermined list order, as dictated by the one or more system applications. Before loading of all of the startup information is complete, a user may select one or more of the additional applications and content using the user input interface 16 (Block 60). For example, the user may select a menu item using the touch screen or scroll to a menu item using the touch-sensitive circular interface.

The selected application or content cannot be accessed until it has been loaded. Accordingly, in order to optimize the time between a user selection and access to the selected information, the selected application or content may be loaded out of order. That is, if the selected information is different from the application or content loading at the time of the selection, the loading information may be aborted (Block 62), and the selected application or content may then be loaded (Block 64). By "aborting" the loading information, the processor 30 (FIG. 1) may stop loading the information from the ROM 34 or the non-volatile storage device 36 to the RAM 32 without finishing the loading of the application being loaded. However, in some cases, it may not be desirable to abort the loading application or content if the information cannot resume loading from its partially loaded state. Therefore, the information may finish loading before the predetermined order is aborted, at which point the selected application or content can be loaded. Once the selected information is loaded, the startup information may then resume loading in the predetermined list order at the point at which it was aborted (Block 58). When the selected application or content is reached in the list order, it may be skipped, as it has already loaded.

In the example where the device 10 (FIG. 1) is a portable music player, the system information may include, for example, boot applications, device drivers, views, a music database, an artwork database, a photo database, and core font glyphs. An exemplary boot application may be the menu application described above. The additional startup information may include, for example, saved workouts, imported photo rolls, contacts, calendars, notes, voice memos, and supplementary data glyphs, and this initial startup information list order may be loaded in this order. In this example, the user may select to open the contacts before the startup information has finished loading. If, for example, the saved workouts are loading when the user selects the contacts, loading of the saved workouts may be aborted or finished. The contacts may then be loaded before the other startup applications and content. Once the contacts have loaded, the saved workouts may finish loading, then the other startup information may continue loading in the predetermined list order. When the contacts are reached in the predetermined list order, they are skipped, and the calendars begin loading. In this manner, the user may alter the order in which applications and content are loaded at startup to minimize the delay between selecting and using information.

Figure 4:
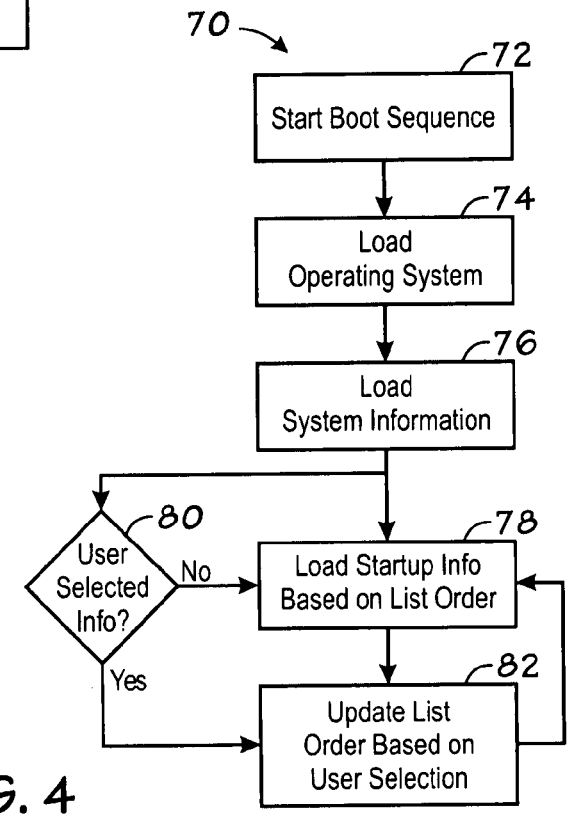
FIG. 4 is a flow chart of a method for organizing the order in which startup applications are loaded in accordance with one example of an embodiment of the present invention.

In accordance with another embodiment, a process 70 for loading the operating system, applications, and content of an electronic device is illustrated in FIG. 4. Again, the boot sequence is started (Block 72), for example, by powering on the device 10 (FIG. 1). The operating system may then be loaded (Block 74), followed by the system information (Block 76). The additional startup information may then begin to load in the predetermined list order (Block 78). If a user selects one or more of the startup applications or content (Block 80), the list order may be altered such that the startup information loads in a new order (Block 82). That is, the altered list order may be saved and repeated upon the next instance of powering on the electronic device 10 (Block 78).

The list order may be altered according to various techniques. For example, in accordance with an embodiment of the process 70, the list order may be alterable every time the electronic device 10 is powered on. That is, every time the user selects a different application or content upon startup of the electronic device 10, the startup list order may be altered accordingly. In another embodiment of the process 70, the list order may be altered after the user has selected the same application or content upon startup of the electronic device 10 based on the number of times the user selects an application or based upon the relative frequency at which the user selects among the various applications. For example, the list order may be altered after the user selects the same application upon startup for five startups in a row. Furthermore, the list order may be altered based on the frequency of a user's startup selections. That is, the application or content which the user has historically selected the most is loaded first, and the list order is changed only if the historical trend changes. For example, if the user selects to open the music player three times out of five and the photo viewer two times out of five, the music player may be the first startup application loaded. However, if the user proceeds to open the photo viewer four times out of seven, the list order may be altered such that the photo viewer is loaded before the music player. The historical trend may be based on the lifetime of the electronic device 10 or may be limited to a set number of startups. Additional techniques for altering the list order may be employed as well.

Using the previous example in which the device 10 (FIG. 1) is the portable music player, the predetermined list order for the startup applications and content may be as follows: saved workouts, imported photo rolls, contacts, calendars, notes, voice memos, and supplementary data glyphs. If the user chooses to access the contacts first, the altered list order may be as follows: contacts, saved workouts, imported photo rolls, calendars, notes, voice memos, and supplementary data glyphs. In this manner, the user's selection may dictate the order in which startup information is loaded to minimize the delay between selection and use.

Figure 5:
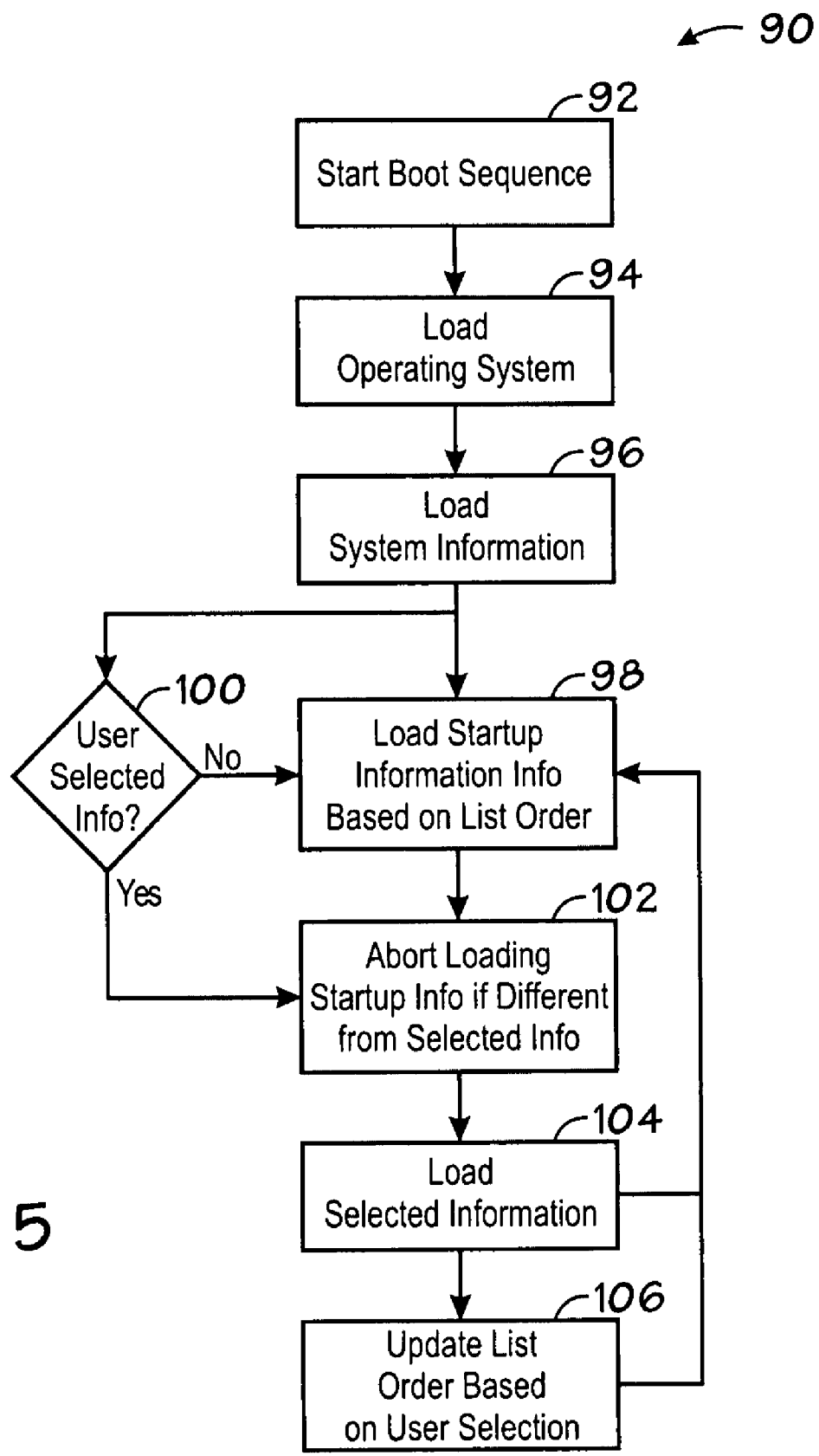
FIG. 5 is a flow chart of a method combining the methods illustrated in FIGS. 3 and 4 in accordance with one example of an embodiment of the present invention.

These techniques may be combined, and FIG. 5 illustrates a process 90 for loading the operating system, applications, and content of an electronic device in accordance with such a further embodiment. In the process 90, the boot sequence is started (Block 92), for example, by powering on the device 10 (FIG. 1). The operating system is loaded (Block 94), followed by the system information (Block 96). The startup information may then begin to load based on the predetermined list order (Block 98). Upon user selection of a startup application or content (Block 100), the loading startup information may be aborted (Block 102), and the selected information may be loaded (Block 104). In addition, the list order may be updated based on the user selection (Block 106). Once the selected application or content is loaded, the startup information may continue to load in the predetermined list order (Block 98). Upon the next instance of powering on the electronic device 10, the startup information may load in the updated list order (Block 98).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for loading an electronic device, the method comprising:
    loading an operating system and system applications prior to loading startup applications or content;
    loading startup applications or content in a predetermined order;
    if a user selects a startup application or content, aborting the initial loading of the startup applications or content in the predetermined order and loading the selected startup application or content; and
    resuming the loading of the startup applications or content in the predetermined order.

2. The method of claim 1, comprising monitoring for the user selection of the selected startup application or content.

3. The method of claim 2, wherein monitoring for the user selection comprises determining when a user selects an item from a main menu.

4. The method of claim 1, wherein the system applications comprise boot applications, device drivers, views, a music database, an artwork database, a photo database, or core font glyphs, or a combination thereof.

5. The method of claim 1, wherein aborting the initial loading of the startup applications or content comprises stopping the loading of an initialized startup application or content after the loading of the initialized startup application or content has begun.

6. The method of claim 1, wherein aborting the initial loading of the startup applications or content comprises completing the loading of an initialized startup application or content before loading the selected startup application or content.

7. The method of claim 1, wherein the startup applications or content comprise saved workouts, imported photo rolls, contacts, calendars, notes, voice memos, or supplementary data glyphs, or a combination thereof.

8. The method of claim 1, comprising updating the predetermined order based on the user selection.

9. A method for loading an electronic device, the method comprising:
    loading an operating system and system applications prior to loading startup applications or content;
    commence loading the startup applications in a predetermined order;
    if a user selects startup applications or content, detecting an order in which the user selects the startup applications or content upon startup of an electronic device;
    saving the order in which the user selects the startup applications or content;
    aborting the loading of the startup applications in the predetermined order; and
    loading the startup applications or content in the saved order.

10. The method of claim 9, comprising updating the saved order every time the user selects a different startup application or content upon startup of the electronic device.

11. The method of claim 9, comprising updating the saved order based on a frequency with which the user selects the startup application or content upon startup of the electronic device.

12. The method of claim 11, wherein the frequency is based on a lifetime of startups of the electronic device.

13. The method of claim 11, wherein the frequency is based on a set number of startups of the electronic device.

14. The method of claim 9, comprising updating the saved order after the user selects the same startup application or content a set number of times in a row upon startup of the electronic device.

15. The method of claim 9, wherein saving the order in which the user selects the startup applications or content comprises overwriting a previous loading order.

16. The method of claim 9, comprising repeating the step of loading the startup applications or content in the saved order.

17. An electronic device, comprising:
    a non-volatile memory device configured to store a loading program that defines a loading sequence;
    a processor configured to load an operating system and system applications prior to loading startup applications and to load startup applications and content into a system memory based on the loading sequence; and
    a user interface configured to deliver user input to the loading program such that a historical trend of user inputs may be evaluated to abort the loading of the startup applications, alter an order of the loading sequence, and load the startup applications in the altered order.

18. The electronic device of claim 17, wherein the non-volatile storage device comprises a hard drive, a flash memory, or a read-only type of memory, or a combination thereof.

19. The electronic device of claim 17, comprising a portable music player.

20. A tangible, non-transitory machine readable medium comprising code executable to perform the tasks of:
    loading an operating system and system applications prior to loading startup applications or content;
    commence loading the startup applications or content onto a memory device in a preset sequence;
    aborting loading of the startup applications in the preset sequence if a user selects startup applications or content;
    altering the preset sequence based on a user selection of one or more of the startup applications or content; and
    loading the startup applications in the altered preset sequence.

21. The tangible, non-transitory machine readable medium of claim 20, comprising code executable to perform the task of aborting the loading of an initialized application or content if different from the user selected startup application or content.

22. The tangible, non-transitory machine readable medium of claim 20, comprising a non-volatile memory.

* * * * *